Aug. 19, 1969     D. H. NEWCOMB ET AL     3,461,908
VACUUM RELIEF VALVE
Filed April 6, 1967     3 Sheets-Sheet 1
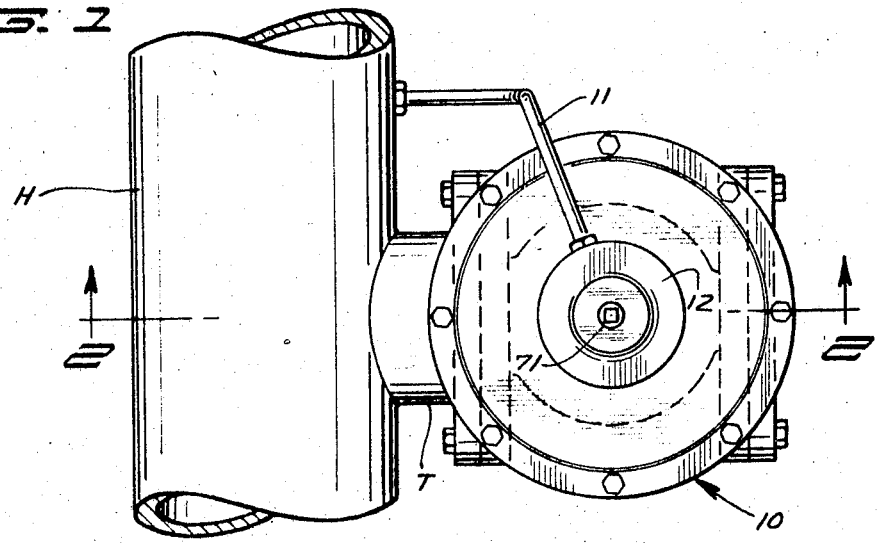
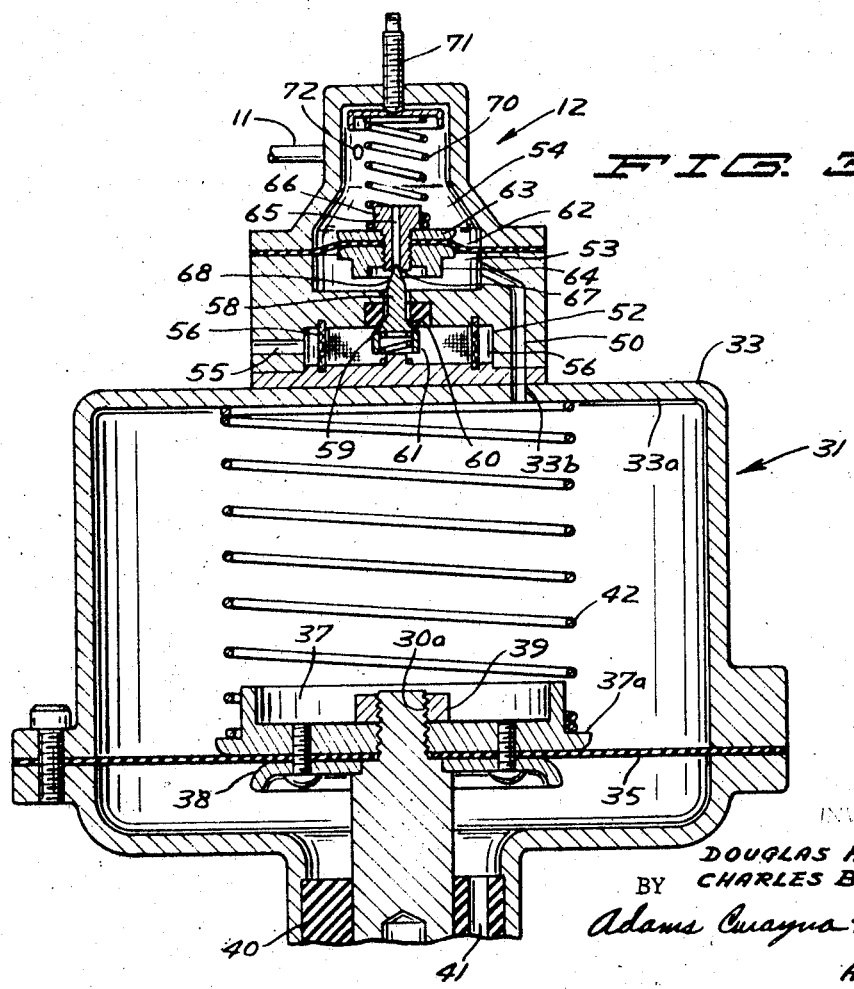
INVENTORS
DOUGLAS H. NEWCOMB
CHARLES B. NICHOLSON
BY
Adams Cuayna & Haugen
ATTORNEYS

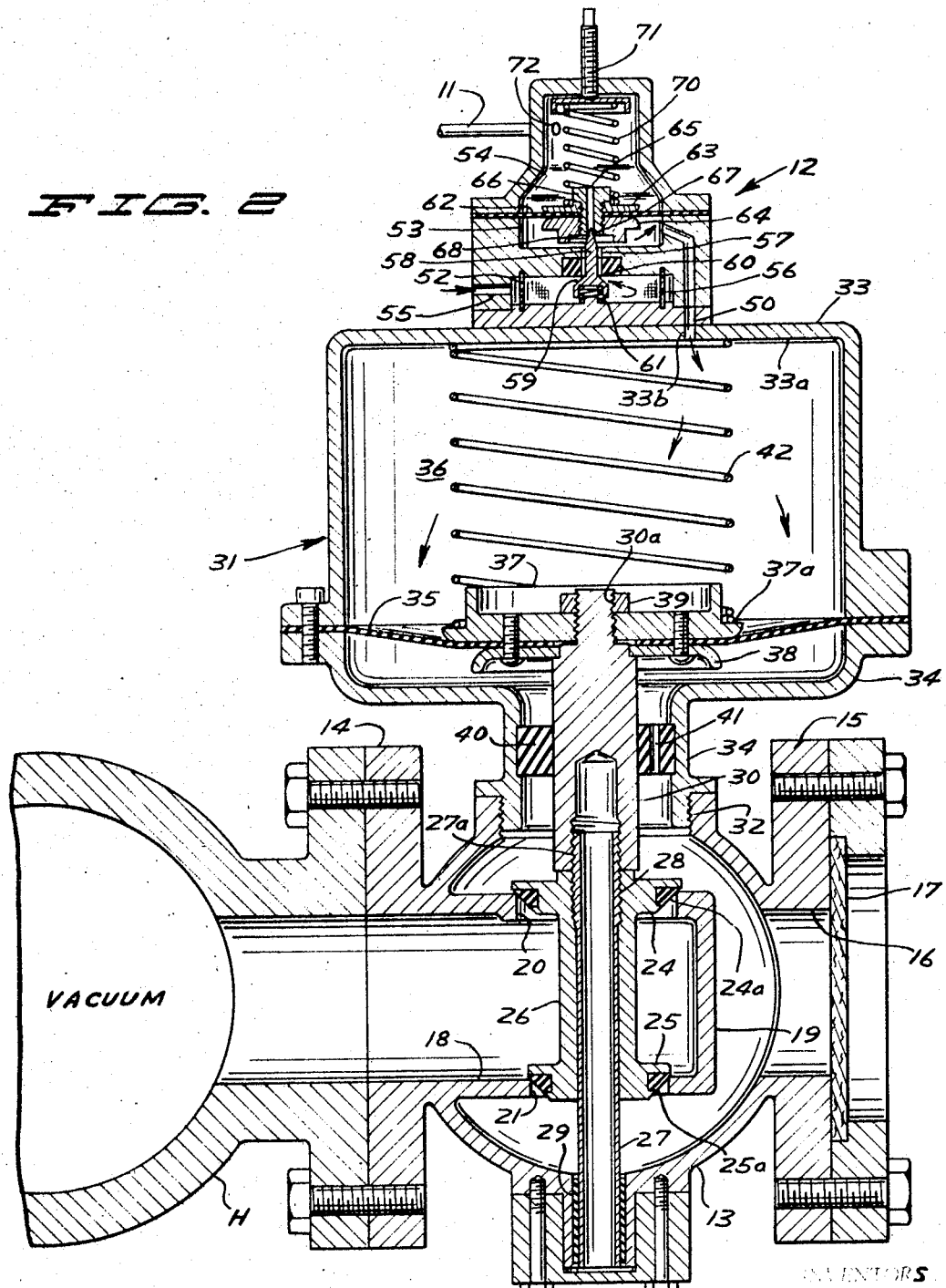

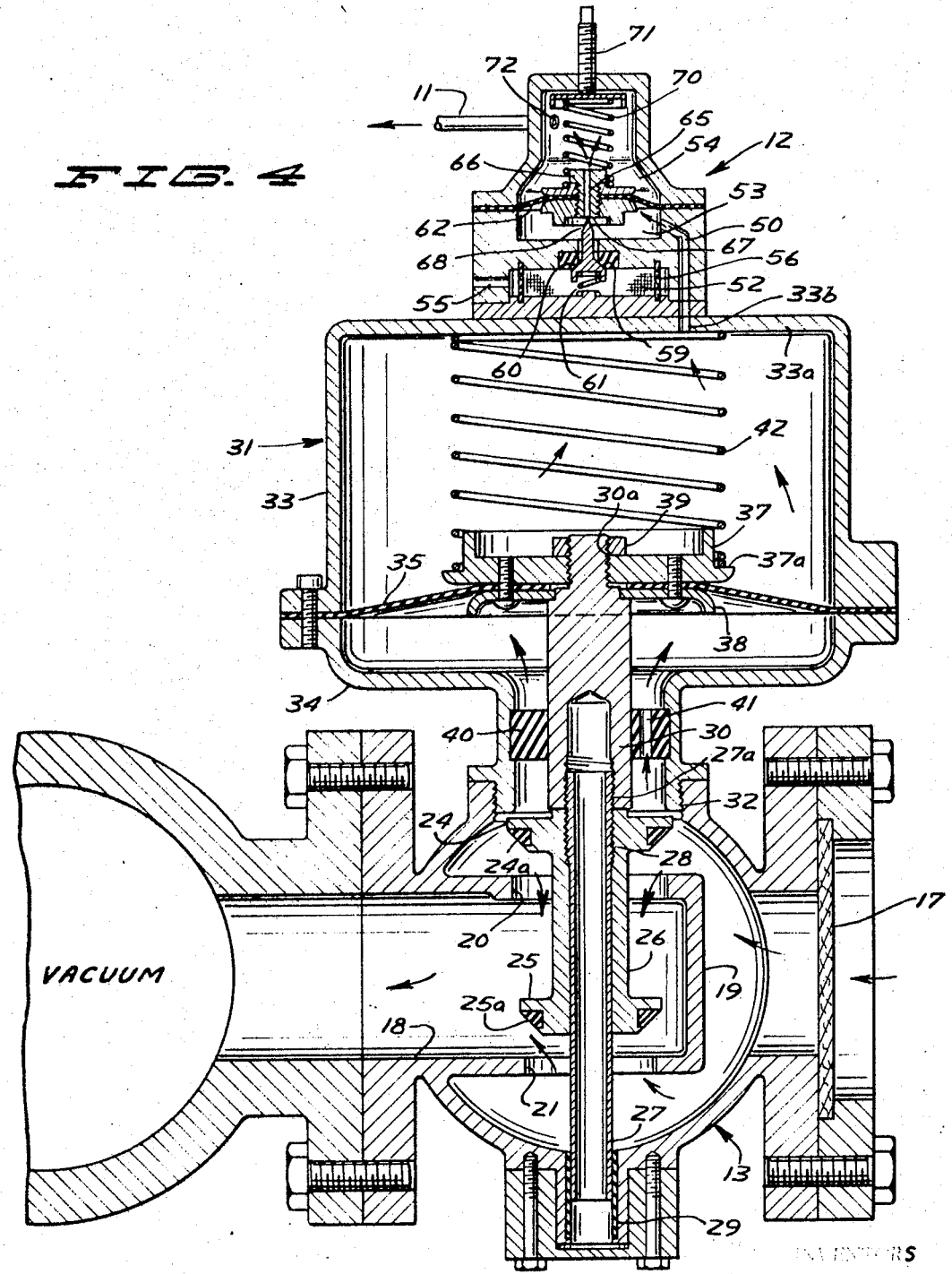

3,461,908
VACUUM RELIEF VALVE
Douglas H. Newcomb, Hudson Falls, and Charles B. Nicholson, Glens Falls, N.Y., assignors to Broughton Corporation, Glens Falls, N.Y., a corporation of New York
Filed Apr. 6, 1967, Ser. No. 628,859
Int. Cl. F16k *17/06*
U.S. Cl. 137—492.5      4 Claims

ABSTRACT OF THE DISCLOSURE

A valve controlling communication between a vacuum header and atmosphere to open the same to atmosphere when the vacuum in the header reaches a predetermined level with an actuating means controlling the communication means and a controller apparatus introducing vacuum pressure or atmospheric pressure to the actuator for actuation thereof. The controller receives its vacuum from the header and is preset by preloading the control portion to introduce either vacuum or atmospheric pressures ot the actuator for actuation thereof. The communication means between the header and atmosphere is normally shifted into a closed position, the unit being designed to relieve excessive vacuums in the header.

---

There are various means presently available for controlling or limiting the vacuum in headers for paper making machines but most of these devices require either manual manipulation or a source of power separate from the machine such as illustrated electrical power. With the device provided by applicants a safety release system is designed to admit atmosphere into the vacuum header whenever this vacuum exceeds a predetermined limit. Besides providing a release system applicants' valve is operated by the power of the vacuum within the header, thereby eliminating any other source of valve opening power. One more advantage with applicants' valve is the prevention of a vacuum pump working against a dead ended or closed system.

It is an object of applicants' invention to provide an atmospheric relief valve to admit atmosphere into the vacuum header of a papermaking machine wherein the power to open the valve is obtained directly from the vacuum header.

It is a further object of applicants' invention to provide a vacuum relief valve and control therefore, which control senses the header vacuum to open the valve when the header vacuum extends a predetermined level.

It is still a further object of applicants' invention to provide a continual monitoring system for a vacuum header of a papermaking machine which monitoring system will prevent a dead ending of the vacuum header and thereby prevent the operation of the vacuum pump against a closed system.

These and other objects and advantages of by invention will more fully appear from the following description made in connection with the accompanying drawings, wherein like reference characters refer to the same or similar parts throughout the several views, and in which:

FIG. 1 is a top plan view of a typical installation of a relief valve embodying the concepts of applicants' invention on a vacuum header;

FIG. 2 is a vertical section taken substantially along lines 2—2 of FIG. 1;

FIG. 3 is an enlarged view of the control and actuating portion of the device; and FIG. 4 is a view similar to FIG. 2 showing the unit in an open position.

As best illustrated in FIG. 2 the valve 10 includes a generally spherical housing 13 having a flange 14 for attachment to the header 11 and a flange 15 having an inlet passage 16 therethrough for communication with the atmosphere. A screen filter 17 may be secured to flange 15 to prevent particles from entering the vacuum header H. In the form shown an outlet conduit 18 having a closed end 19 extends into the interior of housing 13 and is provided with a pair of diametrically opposed passages 20, 21 through the sidewall thereof. Passages 20, 21 provide communication between the header and the atmosphere and function as valve seats and for purposes as described hereinafter passage 20 is larger than 21.

A pair of valve members 24, 25 provided in the form shown as a single spool unit 26 are arranged in control relation to valve seats 20, 21 and have resilient beveled seat portions 24a, 25a about the respective peripheries thereof to close against the seats 20, 21. A control rod 27 is provided internally of spool unit 26 with threaded attachment provided therebetween as at 28. The control rod 27 extends downwardly to a guide bearing 29 formed in the lower portion of housing 13. Upper end 27a of control rod 27 extends above the spool unit 26 for attachment to an actuating rod 30 extending from a power cylinder 31.

Power cylinder 31 is arranged, through a threaded attachment passage 32, in the upper portion of housing 13 in aligned relation to the valve unit 26 and provides the means through which the valve unit 26 is controlled. The power cylinder 31 includes an upper 33 housing and a lower 34 housing having a diaphragm 35 element secured therebetween to provide a closed power chamber 36 above the diaphragm 35. Diaphragm 35 is captured between a pair of clamp elements 37, 38 and actuating rod 30 is connected to at least one of said clamp elements 37, through, for example, a threaded end 30a and nut 39 connection for movement therewith thereby shifting the valve unit 26 in accordance with the movement of diaphragm 35. A guide bearing 40 is provided in the downwardly extending connector portion 34a of housing 34 to guide rod 30 therein and a longitudinal passage 41 therethrough permits the lower housing 34 to be at atmosphere.

A power spring 42 is arranged against a shoulder 37a on clamp element 37 and extends upwardly to abut with the upper interior surface 33a of housing 33 to normally exert a downward closing force on diaphragm 35.

In order to actuate the diaphgram 35 the aforementioned control device 12 is arranged to have its control passage 50 communicating with power chamber 36 as through passage 33b in housing 33.

The control device 12 functions to introduce atmosphere or vacuum into power chamber 36 whereby the valve unit 26 is controlled.

Control device 12 is essentially divided into three individual chambers arranged in a housing consisting of an atmospheric chamber 52, a communication chamber 53 and a vacuum chamber 54 with the communication chamber 53 arranged to communicate with either the atmospheric 52 or vacuum 54 chamber and the power chamber 36 of the power cylinder 31.

Atmospheric chamber 52 is vented to atmosphere through passage 55 and a filter 56 is arranged therein to insure particle free introduction of atmospheric air into the system. Communication is permitted from atmospheric chamber 52 into communication chamber 53 through passage 57 and a needle valve 58 having a conical sealing surface 59 to seal against a conical valve seat 60 arranged in passage 57 is mounted for movement in said passage 57 normally urged against seat 60 by spring 61 to control the communication between said chambers.

A diaphragm 62 is provided between vacuum chamber 54 and communication chamber 53 and clamping elements 63, 64 are provided on either side thereof with a communication passage 65 formed entirely therethrough through the utilization of a passage and seat unit 65 received through the clamp elements 63, 64. The passage and seat unit 66 provides a valve seat 67 in aligned operative relation to sealing end 68 of needle valve 58 which passage 65 and seal end 68 control flow between the vacuum chamber 54 and communication chamber 53.

A setting spring 70 is interposed between upper diaphragm clamp 63 and an adjusting screw mechanism 71 arranged in the upper surface of vacuum chamber 54 to provide means through which the control device may be set to the predetermined desired header vacuum setting. As previously stated a vacuum sensing line 11 is provided to communicate with header H at a remote location and this line 11 enters chambers 54 as at opening 72.

The control device 12 and the power chamber 36 cooperate through the utilization of only an initial setting of the adjusting screw 71 against the setting spring 70 and the vacuum of the header H to provide automatic atmospheric introduction to the header to reduce any increases of vacuum in the header. Although not designed as a control valve, applicants have found that this valve will operate accurately and automatically to prevent any rise in the vacuum down to a rise of one inch of mercury in a vacuum range of two to thirty inches of mercury.

The operation of the relief valve 10 and the control device 12 is illustrated in FIGS. 2, 3 and 4. An initial setting is obtained by compressing the setting spring 70 through screw 71 such that the spring tension on the diaphragm 62 is slightly greater than the header vacuum pull. This allows lower needle valve 59 and valve seat 60 to open allowing atmospheric air to enter the communication chamber 53 from the atmospheric chamber 52 and pass therefrom through passage 50 to the power chamber 36. As atmospheric air exists on both sides of diaphragm 35 the power spring 42 forces the diaphragm 35 downwardly to close the connected valve unit 26 into closed or normal position as shown in FIG. 1. It should be noted that the valve unit 26 having valve members of different size will ordinarily tend to close due to the larger member 24 being arranged in position to cooperate with the vacuum. Another obvious reason for the size differential is the assembly procedure for it would be impossible to position valve member 25 within conduit 18 if the valves 24, 25 and seats 20, 21 were identical in size.

At this adjusting screw setting whenever the header vacuum increases, the pull on diaphragm 62 also increases raising this diaphragm 62 and permitting the lower needle valve 59 to be urged upwardly by spring 61 to seal against seat 60.

This valve closure shuts off atmospheric air to the communication chamber 53. The same diaphragm raising action opens the upper needle seat 67 and valve 68 to permit vacuum from the header to be introduced through the communication chamber 53 and passage 50 into the power chamber 36 to act against diaphragm 35 lifting the same against power spring 42 and thereby lifting the valve unit 26 as seen in FIG. 4, to permit atmospheric air to enter the header H and thereby drop the header vacuum.

After the header vacuum has been dropped the vacuum pull on diaphragm 62 decreases and permits the adjusting spring 70 to urge the diaphragm 62 downwardly to close the upper needle valve 68 into seat 67 as seen in FIG. 3. This closure traps a lesser vacuum in power chamber 36 than that existing in the header H and allows the valve 10 to throttle. Any increase or decrease in the header vacuum will return the valve to one of the other positions. This system, then after the initial setting, is completely automatic in its function, utilizing the power of the header vacuum for the needed valve opening power.

It should be obvious that this valve 10 is an absolute safety valve to prevent a vacuum pump from working against a closed or dead ended system. If all the other vacuum connections are closed this valve will open to admit atmospheric air and prevent damage to a pump.

One aspect in using a valve which is designed to sense and utilize header vacuum is the proper positioning of the sensing line 11. This line preferably is remote from the T to which the valve 10 is connected so as to actually sense the header vacuum and not be responsive to rapid header vacuum changes which could occur if line 11 is adjacent to the T.

It should be obvious that applicant has provided a new and unique vacuum relief valve for the vacuum header of a paper making machine which will control against any rise in the header vacuum by relieving the same to atmosphere and which valve obtains the necessary power to perform the relief function from the vacuum power existing in the header.

It will, of course, be understood that various changes may be made in the form, details, arrangements and proportion of parts without departing from the scope of our invention, which generally stated consists in the matter set forth in the appended claims.

What is claimed is:

1. A relief valve for opening a vacuum header to atmosphere when the vacuum in the header increases above a predetermined level including:
   (a) a housing defining:
      (1) an outlet communicating with the vacuum header;
      (2) an inlet communicating with atmospheric air;
   (b) valve means arranged in said housing in position to control communication between said inlet and said outlet;
   (c) pressure and vacuum responsive actuating means operatively associated with said valve means for shifting the same;
   (d) a vacuum responsive control unit communicating with and controlling the vacuum and pressure transmitted to said actuating means including:
      (1) an atmospheric air inlet passage;
      (2) a vacuum outlet passage;
      (3) a vacuum responsive element arranged to selective connect said atmospheric passage to said actuating means in a first position, said vacuum passage to said actuating means in a second position and closing communication to said actuating means in a balanced position;
      (4) biasing means acting on said vacuum responsive element; and
   (e) a conduit communicating with the header and transmitting the vacuum therein to said control unit.

2. The structure set forth in claim 1 wherein said conduit transmits from the header to said vacuum outlet passage whereby the vacuum responsive element is responsive to the vacuum transmitted from the conduit and transmits this vacuum to said actuating means.

3. The structure set forth in claim 1 wherein the atmospheric air inlet passage of said control unit is provided with filtering means to prevent the admission of particles into said system.

4. The structure set forth in claim 1 and means for adjusting said biasing means to control the shifting of said vacuum responsive element.

References Cited

UNITED STATES PATENTS

| | | | |
|---|---|---|---|
| 2,343,146 | 2/1944 | Jenkins | 137—492.5 XR |
| 2,583,006 | 1/1952 | Niesemann | 137—489.5 XR |
| 2,692,612 | 10/1954 | Drane | 137—625.36 XR |
| 2,955,612 | 10/1960 | Moser | 137—489.5 |
| 2,959,352 | 11/1960 | Cunningham | 137—489.5 XR |
| 3,071,146 | 1/1963 | Friedell et al. | 137—489.5 XR |
| 3,079,121 | 2/1963 | Griffing | 137—489.5 XR |
| 3,139,899 | 7/1964 | Schwerter | 137—489.5 |
| 3,153,424 | 10/1964 | Acker et al. | 137—625.36 XR |

M. CARY NELSON, Primary Examiner

ROBERT J. MILLER, Assistant Examiner

U.S. Cl. X.R.

137—103